US010867210B2

(12) United States Patent
Mao et al.

(10) Patent No.: US 10,867,210 B2
(45) Date of Patent: Dec. 15, 2020

(54) NEURAL NETWORKS FOR COARSE- AND FINE-OBJECT CLASSIFICATIONS

(71) Applicant: Waymo LLC, Mountain View, CA (US)

(72) Inventors: Junhua Mao, Palo Alto, CA (US); Congcong Li, Cupertino, CA (US); Yang Song, San Jose, CA (US)

(73) Assignee: Waymo LLC, Mountain View, CA (US)

(*) Notice: Subject to any disclaimer, the term of this patent is extended or adjusted under 35 U.S.C. 154(b) by 69 days.

(21) Appl. No.: 16/229,332

(22) Filed: Dec. 21, 2018

(65) Prior Publication Data

US 2020/0202168 A1    Jun. 25, 2020

(51) Int. Cl.
 *G06K 9/62* (2006.01)
 *G05D 1/02* (2020.01)
 *G06K 9/00* (2006.01)
 *G06N 3/04* (2006.01)
 *G06N 3/08* (2006.01)

(52) U.S. Cl.
 CPC ......... *G06K 9/6227* (2013.01); *G05D 1/0221* (2013.01); *G05D 1/0231* (2013.01); *G06K 9/00791* (2013.01); *G06K 9/628* (2013.01); *G06K 9/6257* (2013.01); *G06K 9/6262* (2013.01); *G06K 9/6288* (2013.01); *G06N 3/0445* (2013.01); *G06N 3/08* (2013.01)

(58) Field of Classification Search
 CPC .............. G05D 1/0221; G05D 1/0231; G06K 9/00791; G06K 9/6257; G06K 9/6262; G06K 9/628; G06K 9/6288; G06N 3/0445; G06N 3/08
 See application file for complete search history.

(56) References Cited

U.S. PATENT DOCUMENTS

| 5,311,600 | A |   | 5/1994  | Aghajan et al. |
| 5,479,570 | A | * | 12/1995 | Imagawa ............ G06N 3/08 706/20 |
| 5,541,590 | A |   | 7/1996  | Nishio |
| 5,640,468 | A |   | 6/1997  | Hsu |

(Continued)

FOREIGN PATENT DOCUMENTS

DE    102013020435 A1 *  6/2014

OTHER PUBLICATIONS

Machine translation of Stein (DE 102013020435 A1), dated Apr. 28, 2020, pp. 1-8 (Year: 2020).*

(Continued)

*Primary Examiner* — Edward Park
(74) *Attorney, Agent, or Firm* — Fish & Richardson P.C.

(57) ABSTRACT

Aspects of the subject matter disclosed herein include methods, systems, and other techniques for training, in a first phase, an object classifier neural network with a first set of training data, the first set of training data including a first plurality of training examples, each training example in the first set of training data being labeled with a coarse-object classification; and training, in a second phase after completion of the first phase, the object classifier neural network with a second set of training data, the second set of training data including a second plurality of training examples, each training example in the second set of training data being labeled with a fine-object classification.

16 Claims, 7 Drawing Sheets

(56) References Cited

U.S. PATENT DOCUMENTS

| | | | |
|---|---|---|---|
| 5,963,653 A * | 10/1999 | McNary | G01S 7/417 |
| | | | 342/109 |
| 5,966,701 A * | 10/1999 | Kohda | G06K 9/6267 |
| | | | 706/20 |
| 6,208,963 B1 | 3/2001 | Martinez et al. | |
| 6,404,920 B1 | 6/2002 | Hsu | |
| 7,672,920 B2 | 3/2010 | Ito et al. | |
| 8,649,932 B2 | 2/2014 | Mian et al. | |
| 9,015,093 B1 | 4/2015 | Commons | |
| 9,229,102 B1 | 1/2016 | Wright et al. | |
| 9,275,308 B2 | 3/2016 | Szegedy et al. | |
| 9,760,806 B1 | 9/2017 | Ning et al. | |
| 9,989,964 B2 | 6/2018 | Berntorp et al. | |
| 10,013,640 B1 | 7/2018 | Angelova et al. | |
| 10,235,771 B2 | 3/2019 | Rad et al. | |
| 10,366,502 B1 | 7/2019 | Li | |
| 10,372,130 B1 * | 8/2019 | Kaushansky | G05D 1/0088 |
| 10,586,203 B1 * | 3/2020 | Maldonado | G06K 9/6212 |
| 2003/0233233 A1 | 12/2003 | Hong | |
| 2005/0013486 A1 | 1/2005 | Wiedemann et al. | |
| 2007/0092297 A1 | 4/2007 | Shimura et al. | |
| 2010/0100275 A1 | 4/2010 | Mian et al. | |
| 2010/0169009 A1 | 7/2010 | Breed et al. | |
| 2012/0050021 A1 | 3/2012 | Rao et al. | |
| 2012/0300078 A1 | 11/2012 | Ogata et al. | |
| 2013/0250112 A1 | 9/2013 | Breed | |
| 2014/0210644 A1 | 7/2014 | Breed | |
| 2014/0368493 A1 | 12/2014 | Rogan et al. | |
| 2014/0368807 A1 | 12/2014 | Rogan | |
| 2015/0055821 A1 | 2/2015 | Fotland | |
| 2015/0198951 A1 * | 7/2015 | Thor | B60W 10/22 |
| | | | 701/23 |
| 2016/0260014 A1 * | 9/2016 | Hagawa | G06K 9/4628 |
| 2017/0039436 A1 | 2/2017 | Chen et al. | |
| 2017/0259753 A1 * | 9/2017 | Meyhofer | H04N 13/204 |
| 2018/0157963 A1 | 6/2018 | Salti et al. | |
| 2018/0173971 A1 | 6/2018 | Jia et al. | |
| 2019/0188572 A1 | 6/2019 | Lanctot et al. | |
| 2019/0221121 A1 * | 7/2019 | Guo | G06K 9/00798 |

OTHER PUBLICATIONS

Antony, "Training a neural network in real-time to control a self-driving car," Dec. 10, 2016, retrieved on Aug. 24, 2018, retrieved from URL <https://medium.com/@tantony/training-a-neural-network-in-real-time-to-control-a-self-driving-car-9ee5654978b7>, 6 pages.

Bojarski et al., "End-to-End Deep Learning for Self-Driving Cars," Aug. 17, 2016, retrieved on Aug. 24, 2018, retrieved from URL < https://devblogs.nvidia.com/deep-learning-self-driving-cars/>, 16 pages.

Chen et al., "Once for All: A Two-Flow Convolutional Neural Network for Visual Tracking," IEEE Transactions on Circuits and Systems for Video Technology, Dec. 2018, 28(12):3377-3386.

Chen et al., "DeepDriving: Learning Affordance for Direct Perception in Autonomous Driving," Proceedings of the IEEE International Conference on Computer Vision, 2015, 2722-2730.

Geiger et al., "Vision meets Robotics: The KITTI Dataset," International Journal of Robotics Research, Aug. 2013, 1231-1237.

Hung et al., "Scene Parsing with Global Context Embedding," 2017 IEEE International Conference on Computer Vision (ICCV), Oct. 2017, 2650-2658.

Khosroshahi, "Surround Vehicles Trajectory Analysis with Recurrent Neural Networks," 2016 IEEE 19th International Conference on Intelligent Transportation Systems (ITSC), Nov. 2016, 2267-2272.

Li et al, "Vehicle Detection from 3D Lidar Using Fully Convolutional Network," https://arxiv.org/abs/1608.07916, Aug. 2016, 8 pages.

PCT International Search Report and Written Opinion in International Appln. No. PCT/US2019/067197, dated Apr. 2, 2020, 16 pages.

Pomerleau, "Neural Network Vision for Robot Driving," The Handbook of Brain Theory and Neural Networks, 1996, 22 pages.

princeton.edu [online], "Deep Learning for Self-driving Car," retrieved on Dec. 21, 2016, retrieved from URL <http://www.princeton.edu/~alaink/Orf467F14/Deep%20Driving.pdf>, 32 pages.

Rivals et al., "Real-Time Control of an Autonomous Vehicle: A Neural Network Approach to the Path Following Problem," 5th International Conference on Neural Networks and their Applications, 1993, 11 pages.

Santana et al., "Learning a Driving Simulator," arXiv 1608.01230v1, Aug. 2016, 8 pages.

Socher et al., "Convolutional-Recursive Deep Learning for 3D Object Classification," Advances in Neural Information Processing Systems, 2012, 9 pages.

Guo et al., "SpotTune: Transfer Learning through Adaptive Fine-tuning," https://arxiv.org/abs/1811.08737, Nov. 2018, 10 pages.

Mandisoltani et al., "On the effectiveness of task granularity for transfer learning," https://arxiv.org/abs/1804.09235v2, last revised Nov. 2018, 20 pages.

PCT International Search Report and Written Opinion in International Appln. No. PCT/US2019/067232, dated Jun. 16, 2020, 16 pages.

Rosenfeld et al., "Incremental Learning Through Deep Adaptation," IEEE Transactions on Pattern Analysis and Machine Intelligence, Nov. 2018, 42(3):14 pages.

Sarwar et al., "Incremental Learning in Deep Convolutional Neural Networks Using Partial Network Sharing," https://arxiv.org/abs/1712.02719v2, Sep. 2018, 21 pages.

* cited by examiner

NEURAL NETWORKS FOR COARSE- AND FINE-OBJECT CLASSIFICATIONS

BACKGROUND

This specification relates to autonomous vehicles, and more particularly, for example, to machine-learning models configured to generate classifications of objects represented in data acquired by one or more sensors on a vehicle.

Autonomous vehicles include self-driving cars, boats, and aircraft. As used herein, autonomous vehicles may refer to either fully autonomous vehicles or semi-autonomous vehicles. Fully autonomous vehicles are generally capable of completely automated driving independent of a human operator, whereas semi-autonomous vehicles automate some driving operations but still permit or require human control or intervention to some degree. Autonomous vehicles use a variety of on-board sensors and computer systems to detect nearby objects and use such detections to make control and navigation decisions.

Some autonomous vehicles implement neural networks to aid in discerning information about their environments based on sensor data. Neural networks are machine-learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Often, each neuron can receive one or more inputs and generates an output that is received by another neural network layer. The transformation operations of each layer can be carried out by one or more computers at one or more locations having installed software modules that implement the transformation operations.

SUMMARY

This specification describes systems, methods, devices, and techniques for training and using an object classification neural network system. The object classification neural network system can be configured to process sensor data representing measurements of an object of interest detected in the vicinity of an autonomous vehicle, and to generate object-type classifications for the object. The classifications can include a "coarse" classification and a "fine" classification that represent different levels of semantic understanding of an object. The neural network system can be trained in two phases so as to first optimize the system for determining coarse-object classifications, and then refining the system to determine fine-object classifications. During the second phase in which the system is refined through training focused on fine-object classifications, the values for parameters in certain portions of the system are fixed or frozen based on the target fine-object classification so as to mitigate degradation of the system's coarse-object classification capabilities.

Some aspects of the subject matter described herein include a method for training an object classifier neural network capable of generating coarse-object classifications and fine-object classifications. The method can include actions of training, in a first phase, the object classifier neural network with a first set of training data, the first set of training data including a first plurality of training examples, each training example in the first set of training data being labeled with a coarse-object classification; and training, in a second phase after completion of the first phase, the object classifier neural network with a second set of training data, the second set of training data including a second plurality of training examples, each training example in the second set of training data being labeled with a fine-object classification. Training the object classifier neural network in the second phase can include, for each training example, adjusting parameters of one or more first portions of the neural network that are assigned to the fine-object classification indicated by the label of the training example without adjusting parameters of one or more second portions of the neural network that are not assigned to the fine-object classification indicated by the label of the training example.

These and other implementations can optionally include one or more of the following features.

The one or more first portions of the neural network and the one or more second portions of the neural network can be channel encoder subnetworks that are each configured to process a different channel of sensor data.

Adjusting parameters of the one or more first portions of the neural network can include adjusting parameters of one or more channel encoder subnetworks that are configured to generate outputs that would be processed during an inference phase to generate the fine-object classification indicated by the label of the training example.

Freezing parameters of the one or more second portions of the neural network can include freezing parameters of one or more channel encoder subnetworks that are not configured to generate outputs that would be processed during an inference phase to generate the fine-object classification indicated by the label of the training example.

The actions can further include training one or more fine-object classifiers that are separate from the object classifier neural network, wherein the one or more fine-object classifiers are configured to process one or more channels of encoded sensor data to generate a fine object classification, the one or more channels of encoded sensor data generated by corresponding channel encoders within the object classifier neural network.

The first phase of training the object classifier neural network can be deemed complete when at least a minimum number of training examples from the first plurality of training samples have been processed with the object classifier neural network, or when the object classifier neural network achieves a minimum performance criterion in generating coarse-object classifications for a validation sample set.

The object classifier neural network can be located on an autonomous vehicle, and the coarse-object classifications can be selected from a group comprising at least one of a vehicle, a pedestrian, a cyclist, a motorcyclist, a sign, a background, or an animal.

The fine-object classifications can be selected from a group comprising at least one of a school bus, an emergency vehicle, a passenger vehicle, an adult, or a child.

The actions can further include obtaining a plurality of channels of sensor data, each channel of sensor data representing a different set of measurements of a particular object; and after completion of the second phase, processing with the object classifier neural network the plurality of channels of sensor data to determine at least one of a coarse-object classification or a fine-object classification of the particular object.

The particular object can be an object within a sensing range of an autonomous vehicle, and the plurality of channels of sensor data include a first channel representing measurements from a light detection and ranging (LIDAR) subsystem on the vehicle and a second channel representing measurements from a camera on the vehicle.

The actions can further include using at least one of the coarse-object classification or the fine-object classification of the particular object to affect a driving decision of an autonomous vehicle.

Other aspects of the subject matter described herein include systems for training an object classifier neural network that employ one or more processors and one or more computer-readable media encoded with instructions that, when executed by the one or more processors, cause performance operations corresponding to the actions of the methods described herein. Additionally, some aspects are directed to the encoded computer-readable media itself. Methods, systems, computer-readable media, and other techniques for using an object classifier neural network trained as described herein are also within the scope of the subject matter of this application.

Particular embodiments of the subject matter described in this specification can be implemented so as to realize one or more of the following advantages. An autonomous vehicle system can predict the types of nearby objects to improve understanding of its environment and make better driving and navigation decisions. By providing both coarse- and fine-grained classifications, the vehicle can make more nuanced driving decisions than if only a coarse-object classification were available. Moreover, the training techniques described in this specification can allow the object classification neural network system to maintain high accuracy, or improve accuracy, in generating coarse-object classifications even as the system is subsequently trained to learn fine-object classifications. For example, by freezing the values of parameters within portions of the system that do not process data having high predictive or explanatory power with respect to a particular fine-object classification, undue degradation of the system's coarse-object classification capabilities can be avoided. Moreover, by adjusting only free or non-frozen parameters during training, the system can be trained more efficiently since fewer operations may be required to adjust only a subset of the system's parameters in each training iteration.

The details of one or more embodiments of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
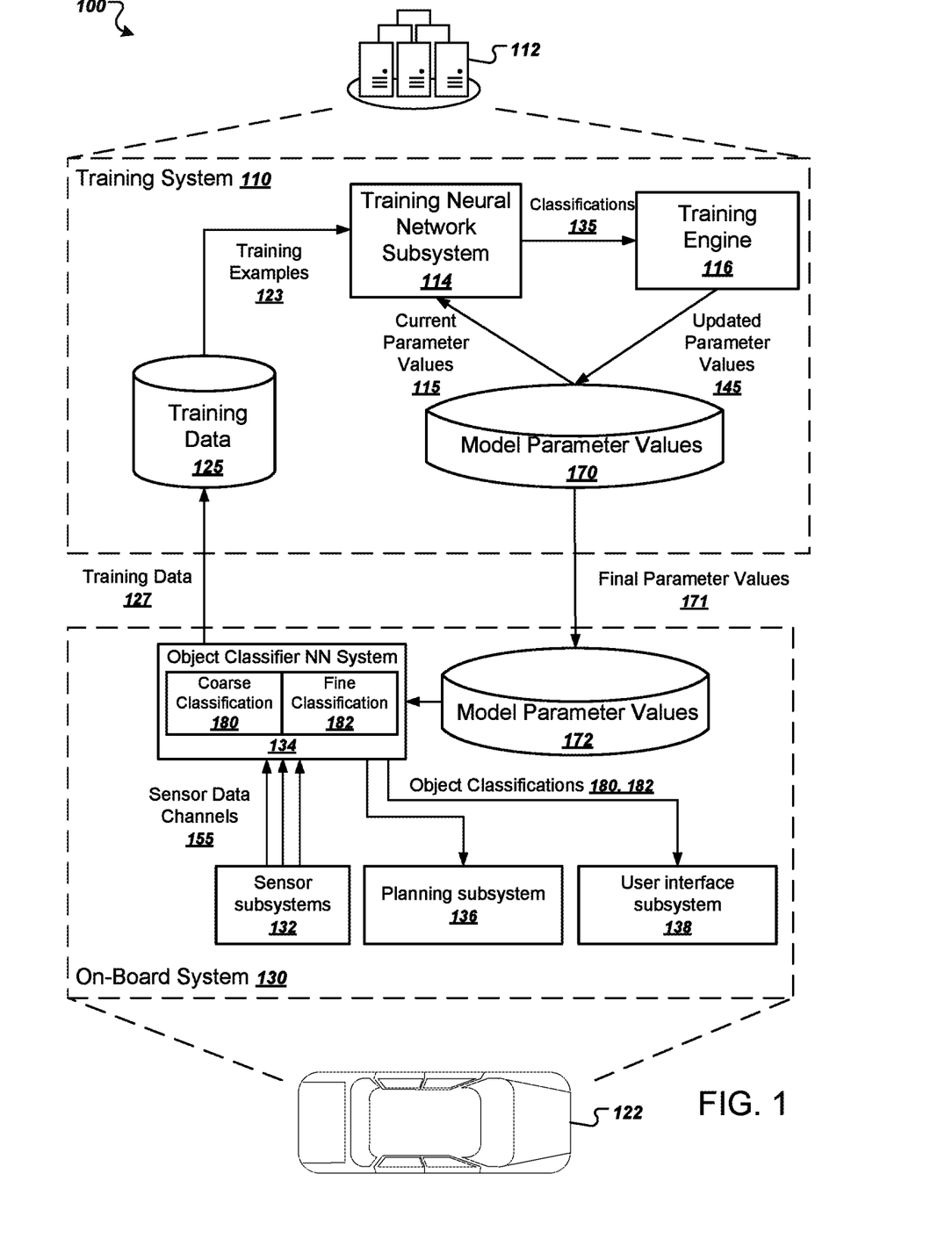
FIG. 1 is a diagram of an example system for training and using an object classification system on an autonomous vehicle.

FIG. 1 is a diagram of an example system 100. The system 100 includes a training system 110 and an on-board system 130. The on-board system 130 is physically located on-board a vehicle 122. The vehicle 122 in FIG. 1 is illustrated as an automobile, but the on-board system 130 can be located on any other appropriate vehicle. Generally, the vehicle 122 is an autonomous vehicle capable of planning and executing driving actions (e.g., steering, braking, accelerating) to navigate to a goal location at least partially independent of human supervision or operation. The vehicle 122 can use object classifications to make sense of its environment and plan driving actions that account for the types of objects that are in the vicinity of the vehicle 122 at any given time.

The on-board system 130 includes one or more sensor subsystems 132. The sensor subsystems 132 include components for sensing information about the vehicle's environment. One or more of the subsystems 132 can be configured to detect and process information about reflections of electromagnetic radiation emitted by particular ones of the subsystems 132, such as a light detection and ranging (LIDAR) subsystem that detects and processes reflections of laser light, and a radio detection and ranging (RADAR) subsystem that detects and processes reflections of radio waves. The sensor subsystems 132 can also include one or more camera subsystems that detect and process visible light. The camera subsystems can be monoscopic, stereoscopic, or other multi-view cameras that permit determination of depth of objects shown in the image based on differences in spatial orientations/offsets of the cameras' image sensors. With respect to LIDAR and RADAR, the raw sensor data can indicate a distance, a direction, and an intensity of reflected radiation. For instance, each sensor can transmit one or more pulses of electromagnetic radiation in a particular direction and can measure the intensity of any reflections as well as the time that the reflection was received. A distance can be computed by determining a time delay between a pulse and its corresponding reflection. Each sensor can continually sweep a particular space in angle, azimuth, or both. Sweeping in azimuth, for example, can allow a sensor to detect multiple objects along a same line of sight.

The sensor subsystems 132 can also classify groups of one or more raw sensor measurements as corresponding to another object (e.g., another vehicle in proximity of vehicle 22). Each group of raw sensor measurements can be represented as a three-dimensional point cloud, with each point having, for example, an intensity, a position, and an elongation.

The sensor subsystems 132 can provide one or more types of sensor data 155 to an on-board object classifier neural network system 134. The sensor data 155, for example, can include point-cloud data from LIDAR or RADAR subsystems, image data from camera subsystems, in addition to data from other sensor subsystems. The sensor data can include multiple channels, and in some implementations each channel carries data corresponding to a different sensor subsystem 132. The object classifier neural network system 134 processes the sensor data 155 to generate a coarse-object classification 180 and, optionally, a fine-object classification 182. The coarse-object classification 180 is a predicted classification for the object (e.g., a type of object) from among a set of possible coarse classifications (e.g., pedestrian, vehicle, sign, animal). The fine-object classification 182 is a predicted classification for the object (e.g., a sub-type of the object) from among a set of possible fine-object classifications (e.g., stop sign, yield sign, speed limit sign or school bus, sedan, emergency vehicle). The fine-object classification 182 generally represents a lower-level classification of the object than the coarse-object classification 182. In some implementations, in addition to or alternatively to representing a sub-type of the coarse object, the fine-object classification 182 can represent an attribute of the object such as whether a vehicle's light is currently flashing (e.g., whether a turn signal is activated) or whether a pedestrian is making one or more types of gestures, movements, or actions. Additional detail about an object classifier neural network system 134 is described with respect to FIGS. 2-6.

The object classifier neural network system 134 can provide object classifications 180 and 182 to other systems on the vehicle 122 and/or present the object classifications to a driver of the vehicle 122 to inform the systems or the driver about the types of objects that have been detected nearby the vehicle. For example, a planning subsystem 136 can use the object classifications 180, 182 to make fully-autonomous or semi-autonomous driving decisions, thereby controlling the vehicle 122 based at least in part on the coarse-object classification 180, the fine-object classification 182, or both. For example, the planning subsystem 136 can anticipate movements of other objects and determine how to maneuver around other objects based on the classifications 180 and 182 provided by the object classifier neural network system 134.

The user interface subsystem 138 can receive the object classifications 180 and 182, and can generate a graphical user interface that presents the locations of nearby objects with labels or other visual indicators describing the objects based on classifications 180, 182. An on-board display device can then display the user interface presentation for view by a driver or passengers of the vehicle 122.

The object classifier neural network system 134 can also use the sensor data 155 to generate training data 127. The on-board system 130 can provide the training data 127 to the training system 110 in offline batches or in an online fashion, e.g., continually whenever it is generated. The on-board system 130 can generate portions of training examples in the training data 127 that characterize sets of sensor data 155. Each training example can then be labeled with a coarse-object classification, a fine-object classification, or both representing the type of object and/or attributes of the object that is the subject of each set of sensor data 115. Alternatively, the on-board system 130 can automatically generate classifications for the training data 127 from objects whose classifications can be determined by the on-board system 130.

The training system 110 is typically hosted within a data center 112, which can be a distributed computing system having hundreds or thousands of computers in one or more locations. Additional details about operations for training an object classifier neural network system are described with respect to FIGS. 4-6.

The training system 110 includes a training neural network subsystem 114 that can implement the operations of each layer of a neural network that is designed to make object classification predictions from sensor data. The training neural network subsystem 114 includes a plurality of computing devices having software or hardware modules that implement the respective operations of each layer of the neural network according to an architecture of the neural network. Generally, the training neural network subsystem 114 has the same architecture as the object classifier neural network system 134. However, the training system 110 need not use the same hardware to compute the operations of each layer. In other words, the training system 110 can use CPUs only, highly parallelized hardware, or some combination of these. For simplicity, this specification sometimes refers to the object classifier neural network system performing operations during training, but this does not necessarily imply that the same computers or hardware are employed for training and inference.

The training neural network subsystem 114 can compute the operations of each layer of the training neural network subsystem 114 (or object classifier neural network system 134) using current parameter values 115 stored in a collection of model parameter values 170. Although illustrated as being logically separated, the model parameter values 170 and the software or hardware modules performing the operations may actually be located on the same computing device or on the same memory device.

The training neural network subsystem 114 can generate, for each training example 123, coarse- and/or fine-object classifications 135. A training engine 116 analyzes the object classifications 135 and compares the object classifications to the labels in the training examples 123. The training engine 116 then generates updated model parameter values 145 by using an appropriate updating technique, e.g., stochastic gradient descent with backpropagation. The training engine 116 can then update the collection of model parameter values 170 using the updated model parameter values 145.

After training is complete, the training system 110 can provide a final set of parameter values 171 to the on-board system 130 for use in making object classifications 180 and 182. The training system 110 can provide the final set of model parameter values 171 by a wired or wireless connection to the on-board system 130, for example.

Figure 2:
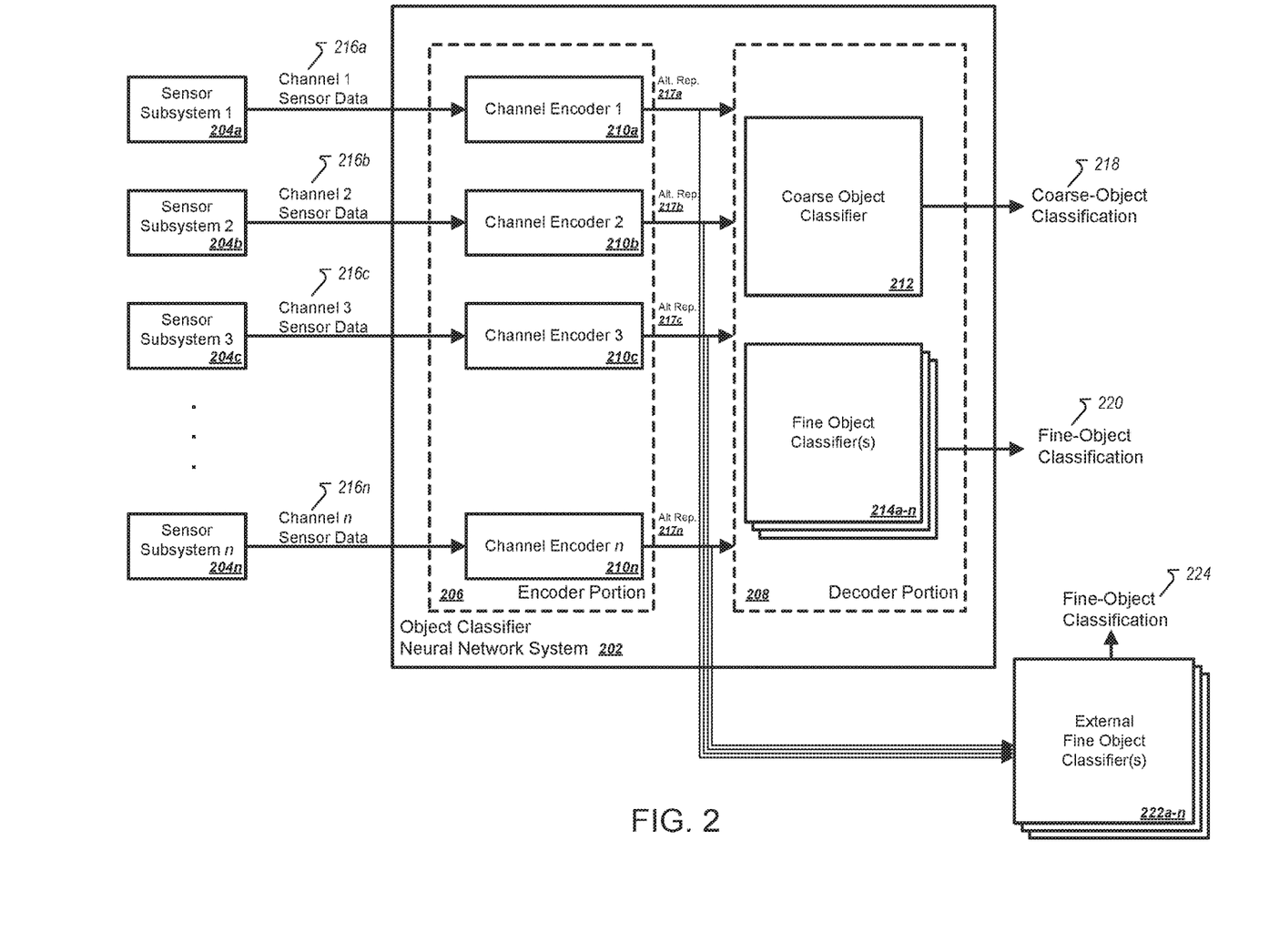
FIG. 2 is a diagram of an example architecture of an object classifier neural network system.

FIG. 2 is a diagram of an example system for object classification. An object classifier neural network system 202 is shown, which is capable of generating both coarse-object classifications 218 and fine-object classifications 220. In some implementations, the object classifier neural network system 202 is implemented on an autonomous vehicle, e.g., as object classifier system 134 (FIG. 1). In such implementations, the object classifier neural network system 202 can determine classifications for objects in the vicinity of the vehicle such as pedestrians, vehicles, or road signs. The vehicle can then make driving decisions based at least in part on the object classifications. For example, the vehicle may determine how close or far to move relative to the other object or may predict different movements of the object depending on the object's type or classification.

The object classifier neural network system 202 can be a deep-learning model, e.g., a neural network system. As a deep-learning model, the object classifier neural network system 202 can have many layers of neurons that perform transformations on inputs to the layer to generate an output. The hidden layers of the system 202 generate outputs that are processed by subsequent layers in the system 202, and the last layer generates a final output such as coarse-object classification 218.

The system 202 can include various "sub-networks" that correspond to different portions of the system 200. Each sub-network or portion of the system 200 includes one or more layers of operations to compute one or more outputs of the sub-network from one or more inputs to the sub-network. Moreover, different sub-networks or portions of the system can function independently of other sub-networks or portions of the system. For example, in some implementations, the various channel encoders 210a-n are sub-networks that process inputs independently of the other encoders 210a-n or any other portion of the system 200. Moreover, the system 200 can be a purely feedforward network, or may include recurrent and/or convolutional aspects within one or more portions of the system 200. For example, the system 202 may include recurrent layers that process representations of an object of interest over a period of time to track the object for more than just a discrete point in time.

The object classifier neural network system 202 generates object classifications 218, 220 for an object of interest by processing one or more channels of sensor data 216a-n. Sensor data 216a-n are neural network inputs that represent measurements of the object based on signals captured by various sensor subsystems 204a-n. In the context of an autonomous vehicle, the sensor subsystems 204a-n may include, for example, LIDAR, RADAR, camera, and ultrasonic sensors that use sensor signals to capture information about conditions in an environment surrounding the autonomous vehicle. Each sensor subsystem 204a-n is generally configured to monitor a different aspect of the vehicle's environment, such as different areas of the environment or different properties of the environment based on the use of different sensor subsystems to measure different aspects of the environment.

In one example, each sensor subsystem 204a-n represents a different type of sensor (e.g., LIDAR, RADAR, camera, ultrasonic sensors), and the corresponding channel of sensor data 216a-n provides a neural network input representing the object of interest from a particular type of sensor. Thus, sensor subsystem 204a may be a LIDAR system with the first channel sensor data 216a being a neural network input representing LIDAR data focused on the object of interest, while sensor subsystem 204b may be a camera system with the second channel sensor data 216b being a neural network input representing one or more images captured by the cameras. In other examples, some or all of the sensor subsystems 204a-n are of the same type but differ in other respects such as their respective areas of coverage (e.g., a front-facing camera vs. a rear-facing camera).

The multiple channels of sensor data 216a-n processed by the classifier neural network system 202 represent measurements of the object that were captured at or around the same time, e.g., during a single sweep around the vehicle. In some implementations, the sensor subsystems 204a-n, or another system (e.g., an interface between the sensor subsystems 204a-n and the object classifier neural network system 202), crops the sensor data 216a-n to isolate patches (i.e., portions) of sensor data 216a-n corresponding to the object of interest. For example, a portion of a point cloud derived from LIDAR measurements corresponding to the object of interest may be extracted to remove other objects and background features, and a portion of an image showing the object may be cropped to remove other objects and background features before they are provided as inputs to the object classifier neural network system 202.

The object classifier neural network system 202 includes an encoder portion 206 and a decoder portion 208. The encoder portion 206 includes a set of channel encoders 210a-n, each of which is configured to process a corresponding channel of sensor data 216a-n to generate an alternative representation 217a-n of the sensor data 216a-n. In some implementations, the alternative representations 217a-n are the outputs of the last layers of the respective channel encoders 210a-n, and represent features that can be used by the decoder portion 208 and/or the external fine-object classifiers 222a-n to generate predicted classifications of an object. The channel encoders 210a-n can process each channel of sensor data 216a-n independently before the decoder portion 208 or external fine object classifiers 222a-n process multiple of the alternative representations 217a-n together to generate object-type classifications. The channel encoders 210a-n may have the same or different architectures from each other, and each can include multiple layers of operations that transform a particular channel of sensor data 216a-n into a corresponding alternative representation 217a-n.

The decoder portion 208 of the object classifier neural network system 202 is configured to process the alternative representations 217a-n to generate a coarse-object classification 218 and a fine-object classification 220 for the object of interest. The coarse-object classification 218 indicates a major category of the object of interest, while the fine-object classification 220 indicates a minor category of the object of interest. For example, the coarse-object classification 218 for a person detected in the vicinity of a vehicle may be "pedestrian," and the fine-object classification 220 for the person may be "adult" or "child." In another example, the coarse-object classification 218 for a nearby vehicle may indicate that it is a "vehicle," while the fine-object classification 220 may indicate a type of vehicle such as "school bus," "emergency vehicle," or "sedan." Coarse-object classifications 218 may be selected from a pre-defined set of possible classifications, such as "vehicle," "pedestrian," "cyclist," "motorcyclist," "sign," "background," and "animal." Other sets of coarse-object classifications 218 are also possible.

Fine-object classifications 220 can be defined for one, some, or all of the coarse-object classifications 218, but not all of the major categories within the set of coarse-object classifications 218 necessarily have minor categories. The system 202 may provide the coarse-object classification 218 and fine-object classification 220 in any suitable form. For example, system 202 may output an indication of the single most-likely coarse-object classification 218 and the single most-likely fine-object classification 220 for the object of interest based on confidence or probability scores for each possible classification. In other implementations, the classifications 218 and 220 may be represented as distributions (e.g. of confidence or probability scores) representing the relative likelihoods of the object of interest being within each of the possible object-type classifications.

The decoder portion 208 includes a coarse object classifier 212 and one or more fine object classifiers 214a-n. The coarse object classifier 212 processes the set of alternative representations 217a-n of the various channels of sensor data 216a-n to generate the coarse-object classification 218. Generally, an input layer of the coarse object classifier 212 is connected to the respective output layers of all of the channel encoders 210a-n so that the coarse object classifier 212 processes all of the alternative representations 217a-n from all channels.

The fine object classifiers 214a-n process the set of alternative representations 217a-n of particular sensor data channels 216a-n to generate one or more fine-object classifications 220. The coarse object classifier 212 and fine classifiers 214a-n may be independent sub-networks or may be partially interconnected. In some implementations, the input layer of each fine object classifier 214a-n is connected to only a subset, but not all, of the output layers of the channel encoders 210a-n so that the fine object classifiers 214a-n process only a subset of the alternative representations 217a-n. Moreover, different ones of the fine-object classifiers 214a-n may be connected to the outputs of different subsets of channel encoders 210a-n and may process different combinations of alternative representations 217a-n. For example, a given fine-object classifier in system 202 may process alternative representations 217a-n from corresponding sensor channels that are deemed to have sufficient explanatory or predictive power with respect to the categories of fine object classifications that the classifier is configured to predict, but not may not process alternative representations 217a-n from other sensor channels to do not have sufficient explanatory or predictive power. For example, a fine object classifier configured to predict whether an object is a school bus may process alternative representations from channel(s) corresponding to image data from camera subsystem(s) but not from channel(s) corresponding to point-cloud data from LIDAR subsystem(s) because the camera images may better allow the classifier to distinguish among vehicle types than the point-cloud data.

In some implementations, the system can further include one or more external fine-object classifiers 222a-n. The external fine-object classifiers 222a-n can be separate from the object classifier neural network system 202. The external fine-object classifiers 222a-n may also be neural networks, or may be implemented as other types of models such as decision trees, support vector machines (SVNs), random forests, or regression models. Although the fine-object classifiers 214a-n within system 202 and the external fine-object classifiers 222a-n can be used together, in many cases the internal fine-object classifiers 214a-n are eliminated or dropped from the system when deployed on a vehicle and only the external fine-object classifiers 222a-n are used. The external fine-object classifiers 222a-n can be advantageous because they may be implemented as compact models that require relatively little storage and consume relatively little computational expense when evaluated to determine a fine-object classification 224. The external fine object classifiers 222a-n can process particular alternative representations 217a-n to generate fine object classification(s) 224. In some implementations, like the fine object classifiers 214a-n within system 202, different fine object classifiers 222a-n process different combinations of alternative representations 217a-n, e.g., only those alternative representations 217a-n that are deemed to have sufficient explanatory or predictive power with respect to the category of fine object classification 224 that is to be made. The alternative representations 217a-n may be formatted in a structured manner, e.g., as a vector or matrix of floating-point values, for processing by the external fine object classifier(s) 222a-n. In some implementations, the external fine object classifiers 222a-n can process additional (auxiliary) inputs beyond the alternative representations 217a-n to generate fine object classification 224. The auxiliary inputs may be derived from sensor data, other context data, the coarse-object classification 218, or a combination of these.

The system may implement different types of fine-object classification schemes. For example, in some cases, a different fine object classifier 214a-n or 222a-n is provided for each major object category for which minor object categories have been defined. Thus, a first fine object classifier 214a or 222a may be provided for vehicles and a second fine object classifier 214b or 222b may be provided for pedestrians. In some cases, a single fine object classifier 214a-n is provided for all possible minor object categories across the major object categories. In other cases, each fine object classifier 214a-n or 222a-n is a binary classifier that generates confidence scores indicating a likelihood that the object of interest is within a particular minor object category. For example, a first fine object classifier 214a or 222a can indicate whether the object is or is not a school bus, a second fine object classifier 214b or 222b can indicate whether the object is or is not an emergency vehicle, a third fine object classifier 214c or 222c can indicate whether the object is or is not an adult pedestrian, and so on. In some implementations, the coarse-object classification 218 is provided as input to the fine object classifiers 214a-n or 222a-n in addition to the alternative representations 217a-n for use in predicting the fine-object classification 220 or 224.

Figure 3:
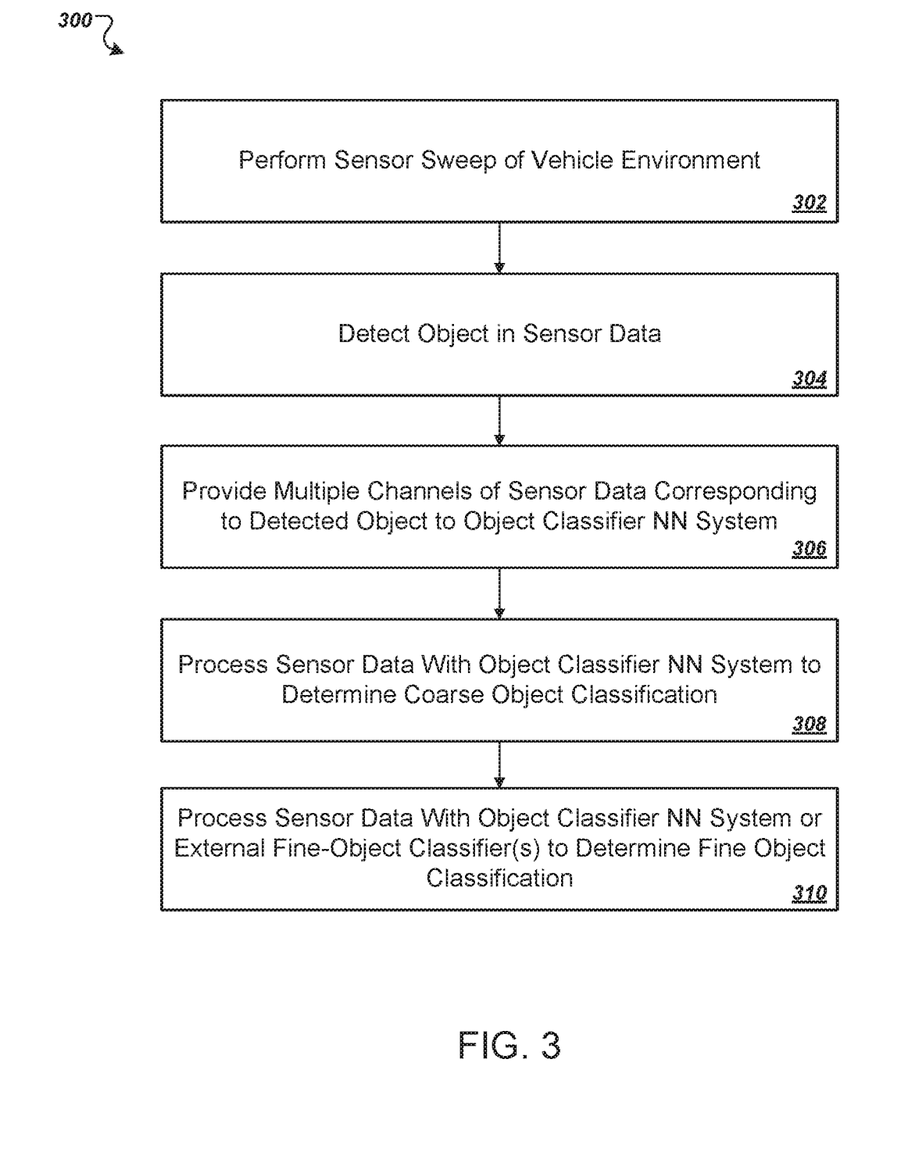
FIG. 3 is a flowchart of an example process for generating coarse- and fine-object classifications using an object classifier neural network system.

FIG. 3 is a flowchart of an example process 300 for determining coarse and fine grain classifications of an object, e.g., an object that has been detected nearby an autonomous vehicle. Stages 306-308 are carried out by an object classifier neural network system such as the systems 134 or 200 depicted in FIGS. 1 and 2, respectively.

At stage 302, one or more sensor subsystems perform a sweep of the environment surrounding the vehicle to obtain measurements of the environment. The sweep may involve sensing information about the environment in all directions around the vehicle with respect to the ground plane, or may involve sensing information about just a portion of the environment. For example, a LIDAR system may scan the environment with a laser and measure characteristics of the reflected light to generate a point-cloud representation of the environment. Likewise, a camera may capture images of the environment during operation of the vehicle.

At stage 304, the system identifies an object of interest in the sensor data and, optionally, crops the sensor data around the object to generate patches that focus on the object of interest to the exclusion of other aspects of the environment (e.g., background areas or other objects). At stage 306, the patches for each sensor channel are formatted and provided as inputs to the object classification neural network system.

At stage 308, the object classification neural network system processes the patches of sensor data to generate a coarse-object classification for the object represented in the sensor data. For instance, the patches can first be encoded independently of each other using channel encoder sub-networks, e.g., channel encoders 210a-n, to generate alternative representations of the patches, and the alternative representations can then be processed by a coarse object classifier, e.g., coarse object classifier 212, to generate the coarse-object classification for the object.

At stage 310, the patches of sensor data are processed with one or more fine-object classifiers within the object classification neural network system, e.g., classifiers 214a-n, or with one or more external fine-object classifiers 222a-n to generate a fine-object classification for the object represented in the sensor data. The fine-object classification can be generated concurrently with or after generating the coarse-object classification. For instance, the alternative representations of the sensor data that were generated by the corresponding channel encoders at stage 308 can be provided as input to one or more fine-object classifiers, e.g., fine object classifiers 214a-n or 222a-n to generate the fine-object classification. That is, the fine-object classifications can be generated by processing only the alternative representations of the sensor data from channels that are deemed to have sufficient predictive or explanatory power with respect to the particular fine-object classification(s) that are made by a given fine-object classifier 214a-n or 222a-n (i.e., channels that are assigned or correspond to the fine-object classification(s) made by the particular fine-object classifier), but without processing alternative representations of the sensor data from channels that are deemed not to have sufficient predictive or explanatory power with respect to the particular fine-object classification(s) that are made by the given fine-object classifier 214*a-n* or 222*a-n* (i.e., channels that are not assigned or correspond to the fine-object classification(s) made by the particular fine-object classifier). Thus, a first fine-object classifier may generate a fine-object classification for an object by processing alternative representations of sensor data from a first subset of sensor channels, and a second fine-object classifier may generate a fine-object classification for an object by processing alternative representations of sensor data from a different second subset of sensor channels. In some implementations, the system saves computational expense by only generating fine-object classifications with the fine object classifiers that correspond to the n (e.g., 1, 2, or 3) most likely coarse classifications. The coarse-object classification, the fine-object classification, or both, can then be processed by other elements of the autonomous vehicle, for example, to plan a maneuver for the vehicle (e.g., a change in speed or direction of movement of the vehicle), and in some cases the vehicle then performs the maneuver according the plan.

Figure 4:
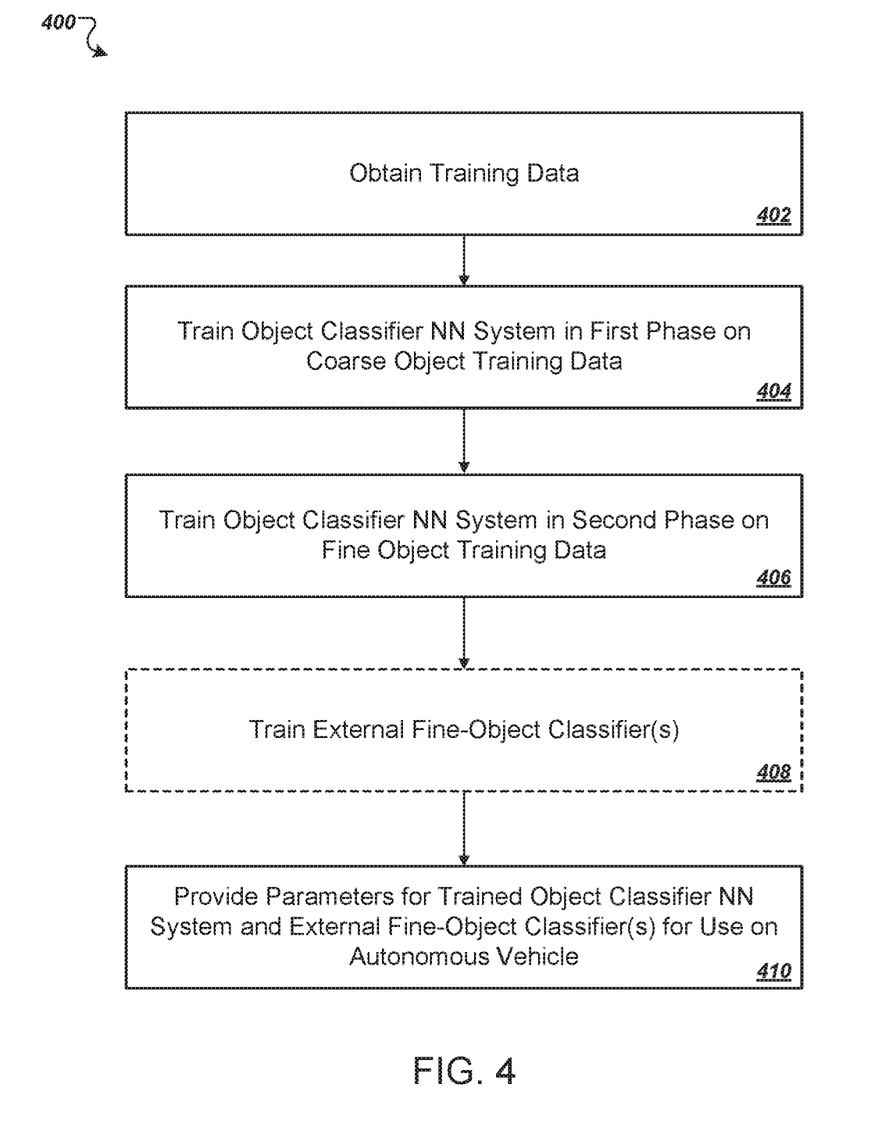
FIG. 4 is a flowchart of an example process for training an object classification neural network system in two phases.

FIG. 4 is a flowchart of an example process 400 for training an object classification neural network system, e.g., systems 134 or 200 depicted in FIGS. 1 and 2, respectively. The process 400 can be carried out by a training system, e.g., training system 110 of FIG. 1, and the training system can include one or more computers in or more locations. The training system is generally configured to train the object classification neural network system in two or three phases. During the first phase, the classification system is trained exclusively or substantially on training data labeled with coarse-object classifications, so as to optimize the coarse object classifier portion of the system. Upon completion of the first phase, the training system performs a second phase to train the classification system to further generate fine-object classifications (and to train the channel encoders to generate alternative representations representing features of each channel that can be used by an external fine object classifier). As explained in detail with respect to FIG. 5, the training system restricts which portions of the classification system can be updated in this phase, so as to mitigate degradation of the system's previously trained coarse-object classification capabilities. In an optional third phase, one or more external fine object classifiers are trained using alternative representations of one or more channels of sensor data.

At stage 402, the training system obtains a set of training data for the object classification neural network system. The training data can include many training examples for training the classification system. Moreover, the training data can include a set of coarse object training data and a set of fine object training data. Each training example in the coarse object set includes (i) a sensor data component having one or more channels of sensor data that characterize sensor signals (e.g., measurements) for an object of interest and (ii) a coarse object label indicating a target coarse-object classification for the object of interest. Each training example in the fine object set includes (i) a sensor data component having one or more channels of sensor data that characterize sensor signals (e.g., measurements) for an object of interest and (ii) a fine object label indicating a target fine-object classification for the object of interest. Some training examples may include both a coarse object label and a fine object label, and can belong to both the coarse object set and the fine object set. The labels indicating target coarse or fine-object classifications represent an accepted "truth" for the classifications of the objects of interest, and labeling can be performed manually by human inspection, automatically (e.g., with a previously trained classification system), or both. Training examples representing a distribution of different classifications are included in the training set, and various objects of interest are represented in the training examples.

At stage 404, the training system trains the object classification neural network system in a first phase. In the first phase, the classification system is trained on the coarse object training data only, or at least a threshold amount (e.g., greater than 90-percent) of training examples selected for the first phase are from the coarse object training data. The training system may employ iterative processes to update parameters of the object classification neural network system (e.g., weights and biases of neurons or perceptrons) using machine-learning techniques such as stochastic gradient descent with backpropagation. In particular, at each iteration the object classification neural network system processes a training example in accordance with current values of the parameters of the system to generate a coarse-object classification prediction. A loss representing an error between the predicted coarse-object classification at the output of the system and the target coarse-object classification is determined, and the training system updates the parameters of the system to reduce the loss. In some implementations, batch training may be employed. Generally, in the first phase, error may be propagated back through the coarse object classifier and each of the channel encoders to optimize the coarse-object classification capabilities of the system. The fine-object classifiers within the decoder portion of the system are generally not trained during the first phase. The system may refrain from generating fine object classifications in the first phase and refrain from updating the values of parameters of the fine object classifiers in this phase. In other implementations, the classification system can be trained on both the coarse object training data and the fine object training data.

At stage 406, once the first phase is complete, the training system initiates a second phase of training the object classification neural network. The second phase focuses on training the classification system to make predictions for fine-object classifications. In the second phase, the training system employs the set of fine object training data having training examples that include labels indicating fine-object classifications for objects of interest represented by the sensor data component of the training examples.

Figure 5:
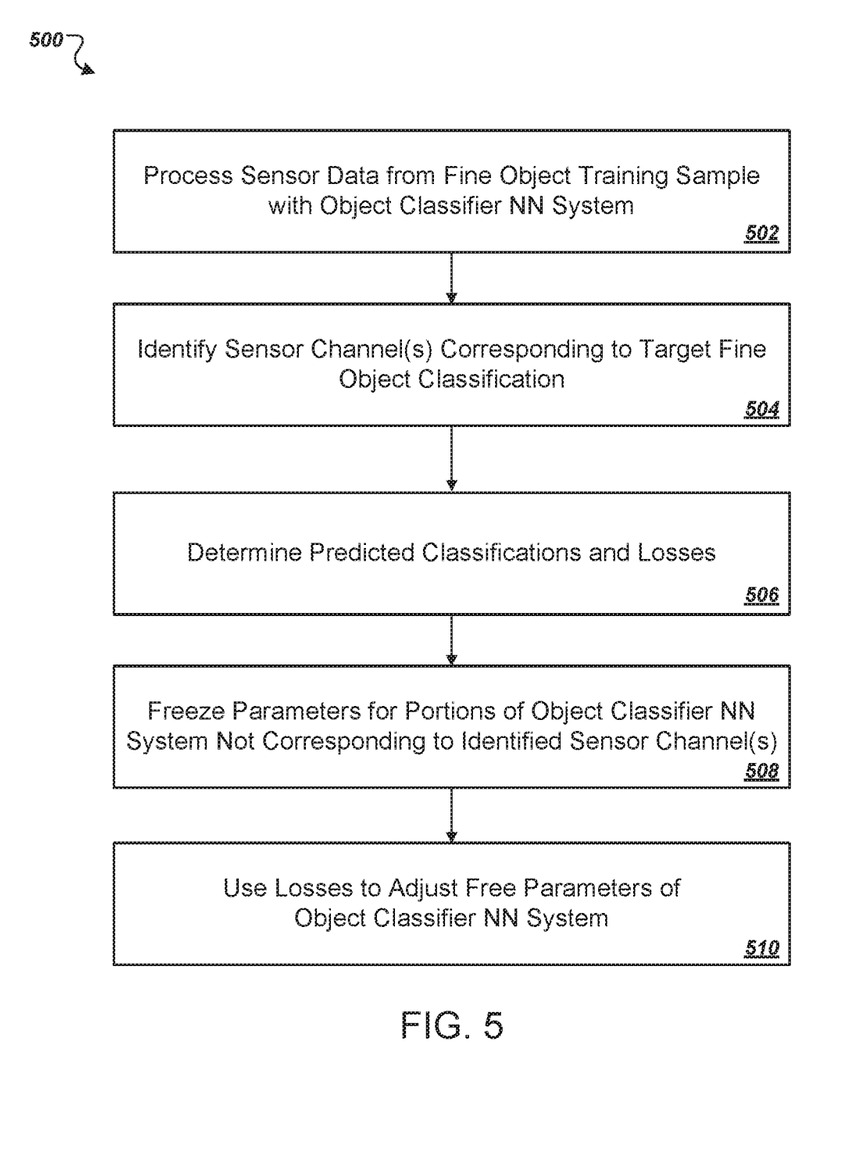
FIG. 5 is a flowchart of operations that can be performed in a training iteration in the second phase of training the object classification neural network system.

In more detail, FIG. 5 is a flowchart of an example process 500 representing operations performed within a given training iteration in the second phase. The training system selects a fine object training example for the iteration. At stage 502, the sensor data component of the selected example is processed with the object classification neural network system according to current values of the parameters of the neural network system, which are initially the values that resulted from training the system based on coarse object training classification training examples in the first phase, and in subsequent iterations the values of the parameters reflect all previous training iterations in both the first phase and the second phase. Through processing the sensor data component of the training example, the neural network system predicts a fine-object classification for the object represented in the training example.

At stage 504, the training system identifies one or more sensor channels that correspond to the target fine-object classification for the training example. For example, the training system may access a database or other data structure that stores, for each possible fine-object classification, correspondence information that maps or links the fine-object classification to one or more sensor channels. The training system may then lookup the corresponding sensor channels for the target fine-object classification by referencing the correspondence information in the database for the target fine-object classification. In some implementations, a sensor channel is mapped or linked to a fine-object classification to indicate correspondence if the sensor channel is deemed to have sufficient predictive or explanatory power with respect to the fine-object classification. It has been observed that different sensor channels provide varying degrees of predictive or explanatory power with respect to different fine-object classifications. For example, projections of point cloud data from a LIDAR sensor channel may be less sensitive to differences between vehicle types than data from other sensor channels, and as a result the LIDAR sensor channel may have relatively little predictive or explanatory power with respect to the 'school bus' fine-object classification because its shape may be similar to trucks and other vehicles regularly encountered while driving. On the other hand, the image data represented in camera sensor channels may have relatively high predictive or explanatory power with respect to the 'school bus' fine-object classification because the image may show color variations or other features that are highly relevant to distinguishing a 'school bus' from other types of vehicles. Therefore, correspondence information that links or maps a camera sensor channel to the 'school bus' fine-object classification may be recorded to indicate correspondence between the same, while no correspondence information (or negative correspondence information) is recorded between a LIDAR sensor channel and the 'school bus' fine-object classification. In general, correspondences between particular sensor channels and fine-object classifications can be based on assumptions, hypotheses, or empirical data (e.g., based on statistical analysis), and may be manually or algorithmically determined. The correspondence information can be generated and stored in advance of training. Different fine-object classifications may be assigned different corresponding sensor channels, and different numbers of corresponding sensor channels may be assigned to different fine-object classifications.

At stage 506, the training system provides the sensor data component of the training example to the object classifier neural network system, which then processes the sensor data component to generate a predicted fine object classification and, optionally, a predicted coarse object classification in accordance with current values of the neural network parameters of the system. If only a fine object classification is predicted, the system may only process the channels of sensor data with the channel encoders that correspond to the target fine-object classification for the training example, and then the fine object classifier corresponding to the target fine-object classification processes the alternative representations form the channel encoders to generate a fine object classification. If a coarse object classification is also predicted, the system may process all channels of available sensor data with all corresponding channel encoders to generate alternative representations for each channel, the coarse object classifier processes all of the alternative representations to generate a predicted coarse object classification, and the fine object classifier processes only the alternative representations for the sensor channels that correspond to the target fine-object classification to generate the predicted fine object classification. The training system can then determine a loss that represents an error between the target fine object classification and the predicted fine object classification. And, if a coarse object prediction was determined, the system can determine an additional loss that represents an error between the target coarse object classification and the predicted coarse object classification.

At stage 508, the training systems "freezes" the values of the parameters for the channel encoders of the object classification neural network system corresponding to the sensor channels that do not correspond to (and are not assigned to) the target fine-object classification of the training example, e.g., the sensor channels that do not demonstrate at least a threshold predictive or explanatory power with respect to the target fine-object classification. For example, the parameters of channel encoders that are not used in generating the target fine-object classification during the inference phase can be frozen while the parameters of channel encoders that are used in generating the fine-object classification during the inference phase can be left free. By freezing the values of these parameters, they are fixed for the current training iteration so that when the object classification neural network system is updated to reduce the losses that were determined at stage 506, the frozen values are not and cannot be changed from their current values (although they may be updated in other training iterations if they correspond to the target fine-object classification of the training examples of the other training iterations). Freezing the values of parameters within non-corresponding channel encoders improves training of the object classification neural network system by preventing changes to the values of parameters that could degrade the system's performance in making coarse-object classifications. In other words, because the non-corresponding channel encoders may not impact the system's ability to make accurate fine-object classifications, they are not adjusted in the present training iteration because the adjustments could risk degrading the system's ability to make accurate coarse-object classifications. Moreover, by freezing some values, training can be more efficient and can be performed faster because not all parameters are updated in each iteration. The values of the parameters of the coarse object classifier can be frozen in some implementations, or may be free (i.e., non-frozen and subject to updating) in other implementations.

At stage 510, the training system adjusts the free parameters of the object classification neural network system based on losses that were determined at stage 506. For example, the system may employ stochastic gradient descent with backpropagation to optimize a loss function that incorporates the losses described above at stage 506 by adjusting values of the free parameters of the object classification neural network system. The values of the frozen parameters are not adjusted in this training iteration. The loss function can include a first loss component based on the error between the predicted and target fine object classifications and, optionally, a second loss component based on the error between the predicted and target coarse object classifications.

Figure 6A:
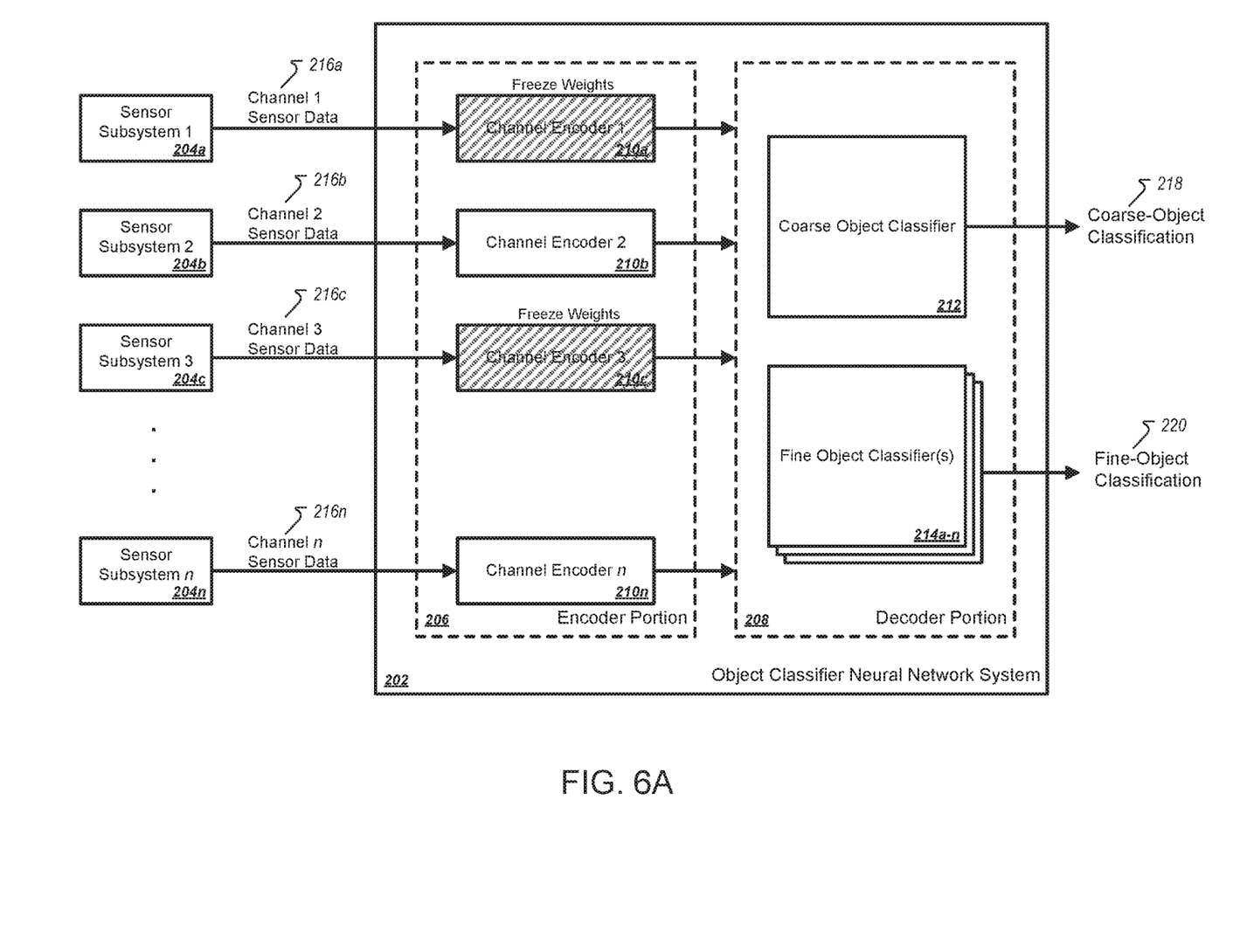
FIGS. 6A and 6B are diagrams of the example architecture of the object classifier neural network system indicating the selection of particular channel encoders and losses to apply in different training iterations.
Figure 6B:
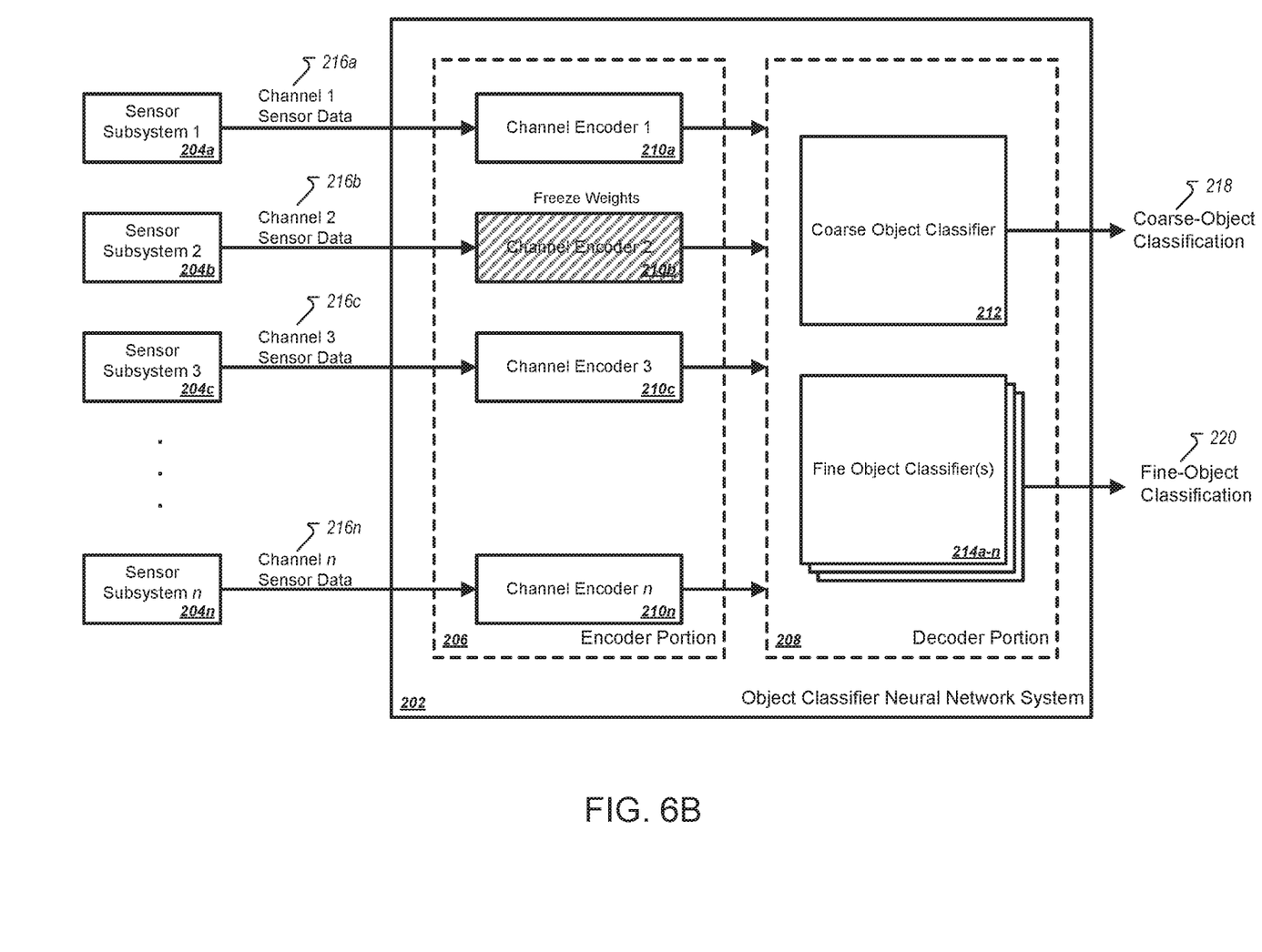

To illustrate by way of example, FIGS. 6A and 6b depict two views of the object classification neural network system 202 during different second phase training iterations. In FIG. 6A, sensor data channels 216b and 216n have been identified as corresponding to the target fine-object classification of the training example in a particular training iteration. As such, the values of the parameters of the corresponding channel encoders 210b and 210n are free to be adjusted in this iteration. Channel encoders 210a and 210c for the non-corresponding sensor data channels 216a and 216c, however, are frozen and the values of their parameters cannot be adjusted in this iteration. By contrast, FIG. 6B shows another example where sensor data channels 216a, 216b, and 216n have been identified as corresponding to the target fine-object classification of the training example in a different training iteration. As such, the values of the parameters of the corresponding channel encoders 210a, 210c, and 210n are free to be adjusted in this iteration. Channel encoder 210b for the non-corresponding sensor data channels 216b, however, is frozen and the values of its parameters are prevented from being adjusted in this iteration.

Referring again to FIG. 4, once the second training phase is complete, the training system optionally trains the one or more external fine object classifiers 222a-n (stage 408). The external classifiers 222a-n can be trained based on training examples that have input components representing alternative representations of sensor data generated by the channel encoders of the object classifier neural network system and any auxiliary inputs. The training examples may further have a label indicating a target fine object classification. Any suitable training process may be employed, which may depend on the type of model is used to implement the external classifiers 222a-n. For example, an iterative dichotimizer or chi-squared automatic interaction detector algorithm may be used to train a decision tree-type of external classifier.

At stage 410, the object classification neural network system and, optionally, external fine object classifiers, are deployed for use on an autonomous vehicle (stage 408). In some implementations, deploying the system involves transmitting the values of the trained parameters of the network and external classifiers to an autonomous vehicle over an appropriate network (e.g., a broadband cellular network). The vehicle can then load the parameters onto a system that implements the architectures of the models, and the system can then be used to determine coarse and fine objects classifications for objects detected in a vicinity of the vehicle. The coarse-object classification, the fine-object classification, or both, can then be processed by other elements of the autonomous vehicle, for example, to plan a maneuver for the vehicle (e.g., a change in speed or direction of movement of the vehicle), and in some cases the vehicle then performs the maneuver based on the plan.

FIGS. 4-6 have described how the object classification neural network system can be trained in two phases that focus, respectively, on training a coarse-object classifier and one or more fine-object classifiers. Alternatively, the system can be trained in a single phase that jointly trains the coarse-object classifiers and the fine-object classifiers in the decoder portion in a single phase. In such implementations, during each training iterations, the system can process the sensor data component of a training sample to generate both a coarse-object classification and a fine object classification. The system can determine losses between the predicted and target coarse and fine object classifications, respectively, and the losses can be weighted and used to update the parameters of the neural network layers using machine-learning techniques such as stochastic gradient descent with backpropagation. In some implementations in which the coarse-object classifier is trained jointly with the fine-object classifiers, the values of parameters for portions of the network can be held fixed and the values of parameters for other portions of the network can be adjusted. The portions of the network that are held fixed and the portions that are adjusted can vary based on the label of the fine-object classification for the training sample. For example, the corresponding channel encoders for the fine-object classification can be adjusted based on a training loss, while the non-corresponding channel encoders can be held fixed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method for training an object classifier neural network capable of generating coarse-object classifications and fine-object classifications, comprising:

training, in a first phase, the object classifier neural network with a first set of training data, the first set of training data including a first plurality of training examples, each training example in the first set of training data being labeled with a coarse-object classification; and training, in a second phase after completion of the first phase, the object classifier neural network with a second set of training data, the second set of training data including a second plurality of training examples, each training example in the second set of training data being labeled with a fine-object classification, wherein training the object classifier neural network in the second phase comprises, for each training example, adjusting parameters of one or more first portions of the neural network that are assigned to the fine-object classification indicated by the label of the training example without adjusting parameters of one or more second portions of the neural network that are not assigned to the fine-object classification indicated by the label of the training example, wherein the one or more first portions of the neural network and the one or more second portions of the neural network are channel encoder subnetworks that are each configured to process a different channel of sensor data, and wherein adjusting parameters of the one or more first portions of the neural network comprises adjusting parameters of one or more channel encoder subnetworks that are configured to generate outputs that would be processed during an inference phase to generate the fine-object classification indicated by the label of the training example.

2. The method of claim 1, further comprising freezing parameters of one or more channel encoder subnetworks that are not configured to generate outputs that would be processed during an inference phase to generate the fine-object classification indicated by the label of the training example.

3. The method of claim 1, further comprising training one or more fine-object classifiers that are separate from the object classifier neural network, wherein the one or more fine-object classifiers are configured to process one or more channels of encoded sensor data to generate a fine object classification, the one or more channels of encoded sensor data generated by corresponding channel encoders within the object classifier neural network.

4. The method of claim 1, wherein the first phase of training the object classifier neural network is complete when at least a minimum number of training examples from the first plurality of training samples have been processed with the object classifier neural network, or when the object classifier neural network achieves a minimum performance criterion in generating coarse-object classifications for a validation sample set.

5. The method of claim 1, wherein the object classifier neural network is located on an autonomous vehicle, and the coarse-object classifications are selected from a group comprising at least one of a vehicle, a pedestrian, a cyclist, a motorcyclist, a sign, a background, or an animal.

6. The method of claim 5, wherein the fine-object classifications are selected from a group comprising at least one of a school bus, an emergency vehicle, a passenger vehicle, an adult, or a child.

7. The method of claim 1, further comprising:
obtaining a plurality of channels of sensor data, each channel of sensor data representing a different set of measurements of a particular object; and
after completion of the second phase, processing with the object classifier neural network the plurality of channels of sensor data to determine at least one of a coarse-object classification or a fine-object classification of the particular object.

8. The method of claim 7, wherein the particular object is an object within a sensing range of an autonomous vehicle, and the plurality of channels of sensor data include a first channel representing measurements from a light detection and ranging (LIDAR) subsystem on the vehicle and a second channel representing measurements from a camera on the vehicle.

9. The method of claim 7, further comprising using at least one of the coarse-object classification or the fine-object classification of the particular object to affect a driving decision of an autonomous vehicle.

10. A system for training an object classifier neural network capable of generating coarse-object classifications and fine-object classifications, comprising:
one or more processors; and
one or more computer-readable media having instructions stored thereon that, when executed by the one or more processors, cause performance of operations comprising:
training, in a first phase, the object classifier neural network with a first set of training data, the first set of training data including a first plurality of training examples, each training example in the first set of training data being labeled with a coarse-object classification; and
training, in a second phase after completion of the first phase, the object classifier neural network with a second set of training data, the second set of training data including a second plurality of training examples, each training example in the second set of training data being labeled with a fine-object classification,
wherein training the object classifier neural network in the second phase comprises, for each training example, adjusting parameters of one or more first portions of the neural network that are assigned to the fine-object classification indicated by the label of the training example without adjusting parameters of one or more second portions of the neural network that are not assigned to the fine-object classification indicated by the label of the training example,
wherein the one or more first portions of the neural network and the one or more second portions of the neural network are channel encoder subnetworks that are each configured to process a different channel of sensor data, and
wherein adjusting parameters of the one or more first portions of the neural network comprises adjusting parameters of one or more channel encoder subnetworks that are configured to generate outputs that would be processed during an inference phase to generate the fine-object classification indicated by the label of the training example.

11. The system of claim 10, wherein the operations further comprise freezing parameters of one or more channel encoder subnetworks that are not configured to generate outputs that would be processed during an inference phase to generate the fine-object classification indicated by the label of the training example.

12. The system of claim 10, wherein the operations further comprise training one or more fine-object classifiers that are separate from the object classifier neural network, wherein the one or more fine-object classifiers are configured to process one or more channels of encoded sensor data to generate a fine object classification, the one or more channels of encoded sensor data generated by corresponding channel encoders within the object classifier neural network.

13. The system of claim 10, wherein the first phase of training the object classifier neural network is complete when at least a minimum number of training examples from the first plurality of training samples have been processed with the object classifier neural network, or when the object classifier neural network achieves a minimum performance criterion in generating coarse-object classifications for a validation sample set.

14. The system of claim 10, wherein the object classifier neural network is located on an autonomous vehicle, and the coarse-object classifications are selected from a group comprising at least one of a vehicle, a pedestrian, a cyclist, a motorcyclist, a sign, a background, or an animal.

15. The system of claim 14, wherein the fine-object classifications are selected from a group comprising at least one of a school bus, an emergency vehicle, a passenger vehicle, an adult, or a child.

16. One or more non-transitory computer-readable media having instructions stored thereon that, when executed by one or more processors, cause performance of operations for training an object classifier neural network capable of generating coarse-object classifications and fine-object classifications, the operations comprising:

training, in a first phase, the object classifier neural network with a first set of training data, the first set of training data including a first plurality of training examples, each training example in the first set of training data being labeled with a coarse-object classification; and training, in a second phase after completion of the first phase, the object classifier neural network with a second set of training data, the second set of training data including a second plurality of training examples, each training example in the second set of training data being labeled with a fine-object classification, wherein training the object classifier neural network in the second phase comprises, for each training example, adjusting parameters of one or more first portions of the neural network that are assigned to the fine-object classification indicated by the label of the training example without adjusting parameters of one or more second portions of the neural network that are not assigned to the fine-object classification indicated by the label of the training example, wherein the one or more first portions of the neural network and the one or more second portions of the neural network are channel encoder subnetworks that are each configured to process a different channel of sensor data, and wherein adjusting parameters of the one or more first portions of the neural network comprises adjusting parameters of one or more channel encoder subnetworks that are configured to generate outputs that would be processed during an inference phase to generate the fine-object classification indicated by the label of the training example.

\* \* \* \* \*